(12) United States Patent
Ehbing et al.

(10) Patent No.: US 7,645,809 B2
(45) Date of Patent: Jan. 12, 2010

(54) PROCESS AND APPARATUS FOR THE OPTIMIZED PRODUCTION OF FOAM IN A CONTINUOUS BLOCK SLABSTOCK PROCESS

(75) Inventors: Hubert Ehbing, Odenthal (DE); Holger Zien, Köln (DE); Johann Frei, Jona (CH)

(73) Assignee: Bayer MaterialScience AG, Leverkusen (DE)

( * ) Notice: Subject to any disclaimer, the term of this patent is extended or adjusted under 35 U.S.C. 154(b) by 488 days.

(21) Appl. No.: 11/337,309

(22) Filed: Jan. 23, 2006

(65) Prior Publication Data

US 2006/0167121 A1 Jul. 27, 2006

(30) Foreign Application Priority Data

Jan. 25, 2005 (DE) ............... 10 2005 003 341

(51) Int. Cl.
- *C08J 9/00* (2006.01)
- *B29C 67/20* (2006.01)
- *B29C 44/34* (2006.01)
- *B29C 43/22* (2006.01)

(52) U.S. Cl. .............. 521/50; 264/46.3; 264/50; 264/51; 264/45.8

(58) Field of Classification Search ........... 521/50; 264/45.8, 46.3, 50, 51

See application file for complete search history.

(56) References Cited

U.S. PATENT DOCUMENTS

| | | | | |
|---|---|---|---|---|
| 3,281,379 A * | 10/1966 | Fontaine et al. | ......... | 521/114 |
| 3,809,512 A | 5/1974 | Blackwell et al. | ......... | 425/4 C |
| 4,056,595 A | 11/1977 | Bokelmann | ......... | 264/46.3 |
| 4,120,626 A * | 10/1978 | Keller | ......... | 425/89 |
| 4,492,664 A | 1/1985 | Bruno | ......... | 264/46.2 |
| 4,970,243 A | 11/1990 | Jacobs et al. | ......... | 521/155 |
| 5,512,602 A | 4/1996 | Horn et al. | ......... | 521/114 |
| 5,604,267 A | 2/1997 | Duffy | ......... | 521/133 |
| 5,804,113 A * | 9/1998 | Blackwell et al. | ......... | 264/51 |
| 5,814,676 A | 9/1998 | Jacobs et al. | ......... | 521/174 |
| 5,859,081 A | 1/1999 | Duffy | ......... | 521/133 |
| 5,863,961 A | 1/1999 | Jacobs et al. | ......... | 521/174 |
| 6,019,919 A * | 2/2000 | Sulzbach et al. | ......... | 264/50 |

(Continued)

FOREIGN PATENT DOCUMENTS

DE   28 19 709 B1   10/1979

(Continued)

OTHER PUBLICATIONS

Journal of Cellular Plastics, vol. 33, Mar. 1997, pp. 102-126, Salvatore Consoli, "Software to Manage a Continuous Production of Flexible Polyurethane Foams by Slabstock Technology".

(Continued)

*Primary Examiner*—Randy Gulakowski
*Assistant Examiner*—Kara Negrelli
(74) *Attorney, Agent, or Firm*—Connolly Bove Lodge & Hutz LLP

(57) ABSTRACT

The invention relates to a plant and a process for the production of foam in a continuous slabstock process in which the actual foam height profile is detected transversely to the feed direction and a correcting variable for the slabstock process based on deviation of the actual foam height profile from a desired foam height profile is determined.

17 Claims, 2 Drawing Sheets

U.S. PATENT DOCUMENTS

| | | | |
|---|---|---|---|
| 6,107,355 A | 8/2000 | Horn et al. | 521/51 |
| 2004/0065973 A1* | 4/2004 | Ehbing et al. | 264/40.4 |

FOREIGN PATENT DOCUMENTS

| | | |
|---|---|---|
| DE | 199 58 689 A1 | 6/2001 |
| FR | 2 424 808 | 11/1979 |
| GB | 2 312 394 A | 10/1997 |

OTHER PUBLICATIONS

Polyurethane 1995, Sep. 26-29, 1995, pp. 489-490, James D. Shoup, "Foam Roundmap On-Line Answenostics".

Adv. Urethane Sci. Techn. 14, (month unavailable) 1998, pp. 1-43, Reinhart Schiffauer, "Mathematical Property Prediction Models for Flexible Polyurethane Foams".

Kunststoffe, issue 88, Oct. 1998, F. Schnabel und K.-H Dörner, "Experten mit System Prozeβsteuerung des PUR-RRIM-Verfahrens zur Herstellung von Karosserieauβenteilen".

Kunststoffe, issue 91, Apr. 2001, Karl-Heinz Dörner, Hans Joachim Meiners, Hans-Joachim Ludwig, "PUR-Teile Kostengünstig fertigen Stand der Polyurethan-RRIM-Technologie".

* cited by examiner

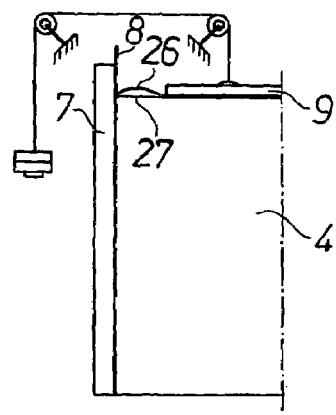
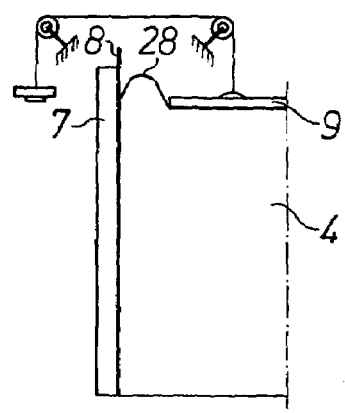
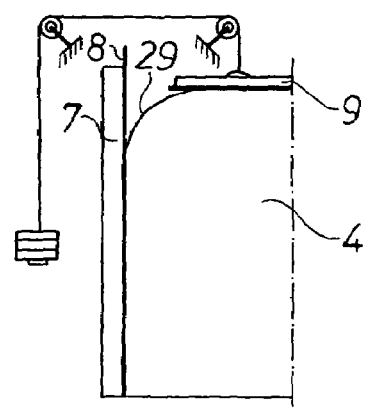
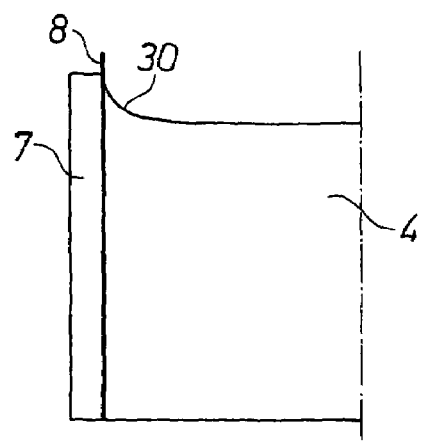
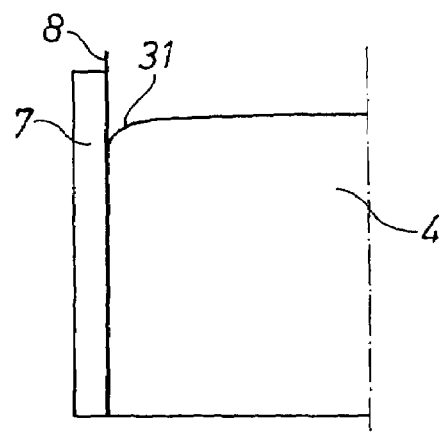

PROCESS AND APPARATUS FOR THE OPTIMIZED PRODUCTION OF FOAM IN A CONTINUOUS BLOCK SLABSTOCK PROCESS

BACKGROUND OF THE INVENTION

The present invention relates to a process and apparatus for the production of foam in a continuous foam process, in particular for the production of polyurethane foam.

The product quality of foams depends on a plurality of environment and plant-related parameters. This is true in particular of the production of polyurethane foam.

Various computer-assisted processes for quality assurance in polyurethane foam production have become known. Such processes are described, for example, in "Software to Manage a Continuous Production of Flexible Polyurethane Foams by Slabstock Technology", Salvatore Consoli, Journal of CELLULAR PLASTICS, Volume 33, March 1997, page 102, "Foam Roadmap On-line Answernostics", James D. Shoup, Polyurethane 1995, Sep. 26-29, 1995, pages 489, 490 and "Mathematical Property Prediction Models for Flexible Polyurethane Foams", Reinhart Schiffauer, Adv. Urethane Sci. Techn. 14 (1998), pages 1 to 44.

Expert systems for the processing of process parameters in RIM processing are also known from "Experten mit System, Prozesssteuerung des PUR-RRIM-Verfahrens zur Herstellung von KarosserieauBenteilen", F. Schnabel, K.-H. Dörner, Kunststoffe, issue 88, 10/98 and "PUR-Teile kostengünstig fertigen, Stand der Polyurethan-RRIM-Technologie", Karl-Heinz Dörner, Hans Joachim Meiners, Hans-Joachim Ludwig, Kunststoffe, issue 91, April 2001. Such expert systems are intended to be able to give information regarding product properties, process monitoring, quality assurance and preventive maintenance.

In addition, DE 28 19 709 B1 describes a process for the continuous production of foam sheets provided with cover layers, in which the thickness of the foam is detected in the intake cross-section by means of ultrasound, transversely to the feed direction. The manufacturing plant is then controlled via the conveyor belt speed and/or the amount of foam applied. The aim is to distribute the foam as uniformly as possible and accordingly achieve uniform foam quality.

DE 196 16 643 C1 describes a process in which, in a plant for the continuous production of foam sheets provided with cover layers, the distance between a fixed point and the edge of the foaming reaction mixture is measured by means of a laser measuring-device. In order to control the quality of the foam sheets, the actual distance value is compared with a foam-dependent desired value. The working speed of the plant is controlled according to the difference between the actual value and the desired value.

DE 199 58 689 A1 describes a process in which the surface of a discontinuously produced foam is recorded by means of a camera. The rise curve of the foam is determined from the recorded data, which in turn gives information about the reaction kinetics of the reaction mixture.

For a continuous slabstock process, DE 102 37 005 A1 describes a process in which defects in the foam due to the chemical kinetics of the foaming process are minimized by continuous detection of the actual rise heights of the foam along the conveyor device. Differences between the actual rise heights and given desired rise heights are corrected by determining a correcting variable which is used to control the slabstock process. While the aim of the process is to achieve a manufacturing process that is as uniform as possible, and hence uniform foam quality, this process does not address the issues presented by wrong settings of the production equipment.

Various processes and plant types for the production of polyurethane slabstock foam and other foams are also known from the prior art. Examples of commercially available apparatus for producing polyurethane slabstock foam are those which are sold under the names Planibloc, Draka-Petzetakis, Maxfoam, Vertifoam Edge Control and VPF processes, as well as UBT and QFM plants.

Various devices for the continuous production of polyurethane foam blocks are also known from DE 691 19 244 T2 and U.S. Pat. No. 4,492,664 A. Another device for the production of polyurethane foam is known from DE 696 10 885 T2. Various processes for the production of polyurethane foams with such apparatus are disclosed in DE 38 19 940 A1, DE 196 49 829 A1, DE 43 15 874 A1 and DE 195 06 671 C2.

SUMMARY OF THE INVENTION

An object of the present invention is to provide an improved process for the production of foam in a continuous slabstock process, and an improved apparatus for the production of foam in such a process.

This and other objects which will be apparent to those skilled in the art are accomplished by determining a correction variable based upon the difference between desired foam height and actual foam height and adjusting one or more process parameters accordingly.

BRIEF DESCRIPTION OF THE DRAWINGS

FIG. 3 shows a correctly adjusted foam cross-sectional profile.

FIG. 4 shows a foam cross-sectional profile with excessive ear formation.

FIG. 5 shows a foam cross-sectional profile with dome formation.

FIG. 6 shows a foam cross-sectional profile with side films which are moved too rapidly in the foaming direction.

FIG. 7 shows a foam cross-sectional profile with side films which are moved too slowly in the foaming direction.

DETAILED DESCRIPTION OF THE INVENTION

Figure 1:
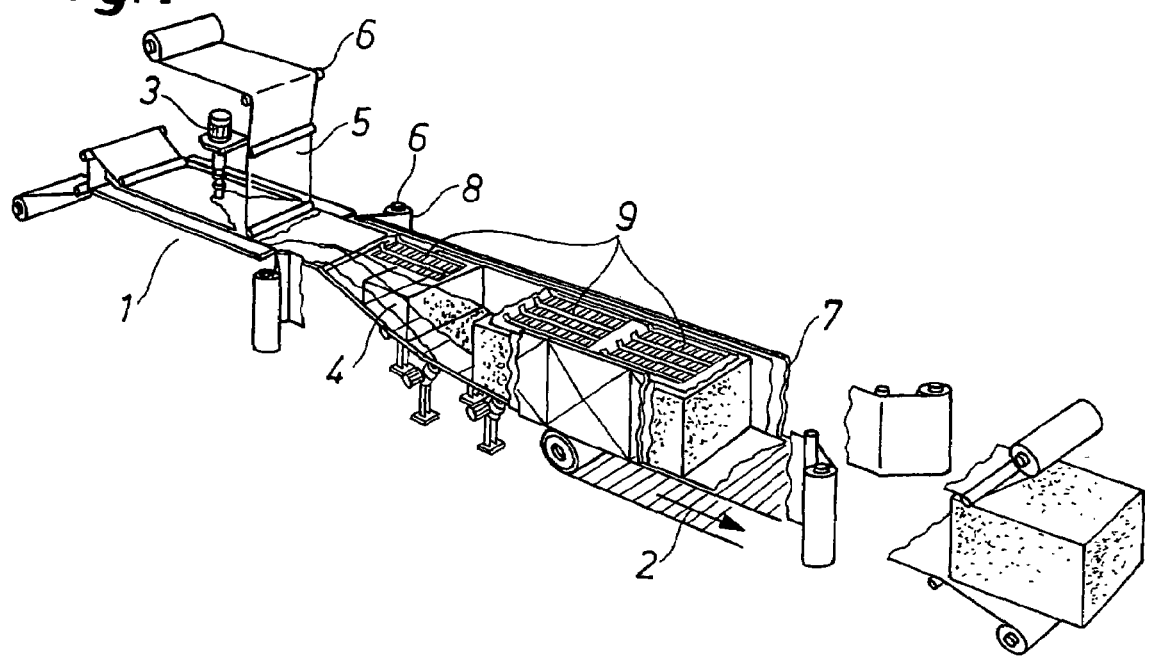
FIG. 1 shows a diagrammatic view of a slabstock plant which is commercially available from Hennecke in a continuous rectangular process (QFM process).

In the continuous production of flexible polyurethane foam in plants having a rectangular foam tunnel, the foaming process along the outer wall of the foam tunnel, or along the side paper, results in a block having a pronounced dome. This is caused by friction of the reaction mixture on the lateral paper sheet. The foam rises more slowly there than in the middle. When rectangular semi-finished products (e.g. mattresses) are cut out of the foam, dome formation reduces the yield of usable foam.

Various processes have been developed for reducing dome formation. In the Draka-Petzetakis process, friction is eliminated by raising a lateral polyethylene film at a specific angle synchronously with the rising movement of the foam. In the Maxfoam process, relative movement between the tunnel wall and the reaction mixture is prevented by a trough extending over the entire width of the block, a run-off slope (fall plate) and a relative movement of the side films.

Processes such as the Hennecke-Planibloc process or plants of the UBT or QFM type use cover weights which are applied to the rising foam. As a result of the pressure of the cover elements, the formation of a dome on the block is prevented. The positioning and weight of the cover elements are critical for the quality of the foam. In practice, both cover elements that are to be adjusted by machine and cover elements that are to be adjusted manually by way of cables and counterweights are used. If the cover weights press on the foam too lightly, dome formation occurs as before. However, if the cover weights press on the foam too heavily, this has a number of disadvantages. On the one hand, foam is pushed upwards between the cover weights and the side wall of the tunnel and in turn becomes a loss due to cutting after curing ("ear formation"). At the same time, the foam structure in the vicinity of the wall is destroyed as a result of the foam being squeezed outwards, and voids may form. Furthermore, cover weights that are set too heavy compress the foam in the upper region of the block, which gives rise to a non-uniform foam structure over the cross-section of the foam block. Because of friction on the wall of the foam tunnel and the resulting curved contour of the foam, it is not possible to achieve a completely rectangular cross-section of the foam and a certain degree of "ear formation" is accordingly necessary.

The present invention makes improved control and improved regulation of the production of foam in a continuous foam process possible by detecting the height profile of the foam at a plurality of points transverse to the feed direction of the foam in the plant. The actual measured values are compared with corresponding desired measured values. A correcting variable for adjusting the process is determined from any deviation of the actual measured values from the desired measured values.

It is particularly advantageous that plant-related parameters and/or the composition of the starting material for the foam can be adjusted during running production of the foam, in order to achieve as constant a cross-section of the foam as possible with minimal losses due to cutting. This is necessary inter alia because the foam plant heats up continuously during operation as a result of the exothermic polyurethane reaction. The foaming behavior changes as a-result. The exothermic heat of reaction also has an effect on the cross-sectional profile of the foam.

Furthermore, the quality of the foam that is produced is improved because, for example, faults caused by cover weights that are set too light or too heavy are avoided. Because the precise adjustment of the cover weights, of the speed or the angle at which the side films are raised, and the gradient of the run-off slope/fall plate are frequently carried out in parallel with the start-up process, or subsequent adjustment is necessary during manufacture, the process additionally has the further advantage that the time required for starting up of the plant and the scrap resulting from the start-up process are reduced.

An unsymmetrical height profile transverse to the foam direction can arise as a result of cover weights which are applied non-uniformly transversely to the feed direction, or as a result of side films which are raised at a greater speed or at a different angle on one side than on the other side. Measurement of the cross-sectional profile over the entire cross-section allows the need for adjustment to be recognized in good time and correction during the process by adjustment of plant- and/or recipe-related parameters.

In one preferred embodiment of the invention, the foam is produced by the Hennecke-Planibloc process and/or in a plant of the UBT or QFM type. Such plants conventionally have a conveyor device on which the expanding foam is moved in a feed direction. In some cases, a so-called fall plate is present in the expansion region of the foam.

According to the invention, after application of a first cover element in the above-mentioned process or in one of the above-mentioned plant types, a plurality of distance sensors are arranged transversely to the feed direction of the foam in order to measure the actual height of the foam at different places. Contactless laser distance sensors or ultrasonic sensors, which permit measurement of the actual height of the foam are preferably used. Alternatively or in addition it is also possible to use light barriers, CCD cameras or other sensors that permit height measurement of the actual rise heights.

In another preferred embodiment of the invention, the foam is produced on plants of the Draka-Petzetakis or Maxfoam type. In both of these types of plant, side films are guided synchronously with the foaming process at a defined angle to the foaming direction, in order to reduce dome formation. The speed of movement of the films, the film tension and the angle at which the films are raised are critical for the shape of the dome that forms. Both processes generally operate without cover weights.

According to the invention, in the last-mentioned processes or in one of the last-mentioned plant types, a plurality of distance sensors are arranged transversely to the feed direction of the foam in order to measure the actual height of the foam at different places. Contactless laser distance sensors or ultrasonic sensors, which permit measurement of the actual height of the foam are preferably used. Alternatively or in addition it is also possible to use light barriers, CCD cameras or other sensors which permit height measurement of the actual rise heights.

In a preferred embodiment of the invention, a compensating curve is plotted on the basis of the measured actual heights of the foam and is compared with a desired curve. For example, individual height values and/or the difference in the gradients of the curves and/or the difference in the integrals of the curves are used as the basis for determining a correcting variable in a manner known to those skilled in the art.

In another preferred embodiment of the invention, the weight and/or the positioning of the cover element(s) is used as the correcting variable. If, for example, the actual heights of the cross-sectional profile are greater than the desired heights, the weight of the cover element(s) is reduced, or their position is changed, until the actual heights correspond sufficiently with the desired heights.

In a further preferred embodiment of the invention, the speeds and the angle at which the side films are drawn in the foaming direction and/or the film tensions are used as the correcting variable. If, for example, the actual heights of the cross-sectional profile are greater than the desired heights, the speed of the side films is reduced until the actual heights correspond sufficiently with the desired heights.

In a further preferred embodiment of the invention, the conveying speed of the expanding foam is used as the correcting variable. If, for example, the actual heights are greater than the desired heights, the conveying speed is increased until the actual heights correspond sufficiently with the desired heights.

In another preferred embodiment of the invention, the amount of material supplied to the slabstock process per unit time is used as the correcting variable. If, for example, the actual heights are greater than the desired heights, the amount of material supplied per unit time is reduced until the actual heights and the desired heights correspond sufficiently.

Among the preferred embodiments of the invention is use of the application method by which the reaction mixture is applied to the transport belt as the correcting variable. To this end, the application movement of the mixing head is preferably used as the correcting variable for the process.

In a further preferred embodiment of the invention, the angle of inclination of the fall plate is used as the correcting variable. If, for example, the actual heights are greater than the desired heights, the angle of inclination of the fall plate is altered until the desired heights and the actual heights correspond again.

According to a further preferred embodiment of the invention, the gap between the upper cover paper and the side paper is used as the correcting variable when cover weights are used. If, for example, the actual heights are greater than the desired heights, the gap can be increased, for example, by choosing a narrower cover paper or by widening the foam tunnel, and the actual heights can be reduced.

In another preferred embodiment of the invention, various correcting variables are determined on the basis of a deviation of the actual heights from the desired heights, such as, for example, a change in the weight of the cover, a change in the film take-off speed, a change in the conveying speed, in the amount of material supplied per unit time and/or in the chemical composition of the material that is supplied.

According to a further preferred embodiment of the invention, regions of reduced quality of the foam that is produced are identified on the basis of the measured cross-sectional height profile. Such regions are cut out of the foam block. In comparison with the prior art, this has the advantage that less scrap material is produced.

Preferred embodiments of the invention are explained in greater detail hereinbelow with reference to the drawings.

FIG. 1 shows a plant or apparatus for the production of foam, in particular polyurethane foam, in a continuous slabstock process according to a QFM process.

The plant has a transport belt 1 which is moved in the feed direction 2. At the start of the transport belt 1 there is a mixing head 3 above the transport belt 1. The mixing head 3 serves to apply a reactive chemical system to the surface of the transport belt 1. The reactive chemical system is a foaming mixture, for example, for the production of polyurethane foam.

The reactive chemical mixture expands on the transport belt 1, so that an expansion region with expanding foam 4 forms. A cover paper 5 is applied to the surface of the foam, which cover paper 5 is supplied by way of rollers 6. Between the foam 4 and the foam tunnel wall 7 there is supplied on both sides a side paper and/or a side film 8, which is likewise supplied by way of rollers 6. In order to reduce dome formation, weights in the form of runners 9 are applied to the upper cover paper 5.

Figure 2:
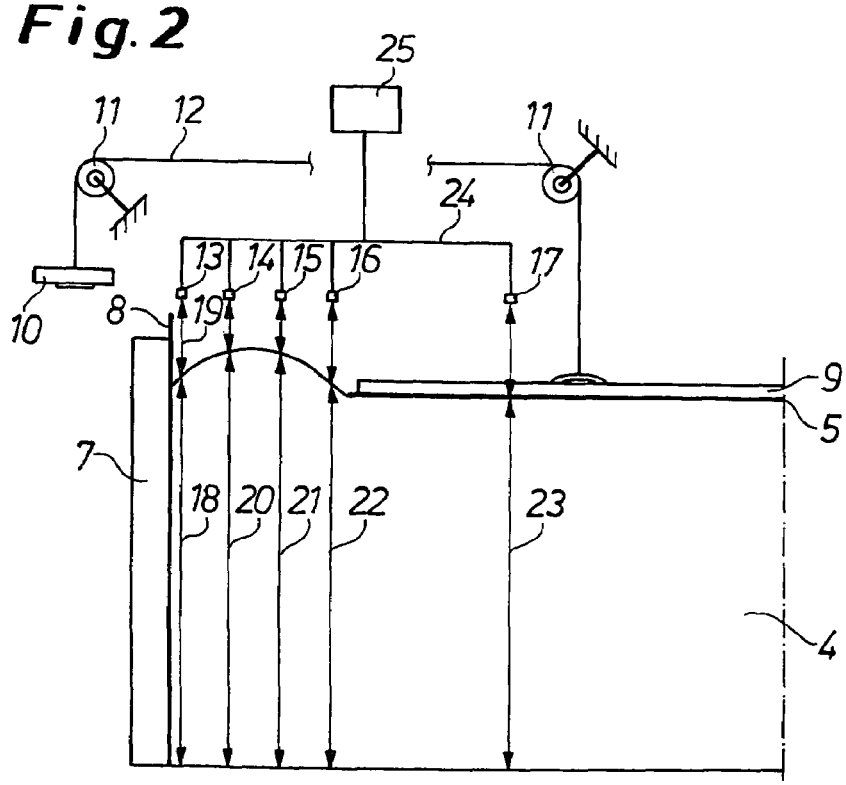
FIG. 2 shows a diagrammatic view of a preferred embodiment of the invention.

FIG. 2 shows a preferred embodiment of the invention in cross-section. The expanded foam 4 is delimited laterally by the side paper 8 and the foam tunnel wall 7. Above the cover paper 5 there is the cover weight 9. In a preferred embodiment, the cover weight 9 is adjusted by means of a counterweight 10. The counterweight 10 is connected to the cover weight 9 by way of a guide roller system 11 and a cable 12.

Sensors 13, 14, 15, 16 and 17 are arranged transversely to the feed direction. The sensor 13, for example, serves to determine the foam height 18 of the foam by measuring the distance 19 between the sensor 13 and the surface of the expanding foam 4. In a corresponding manner, the foam heights 20, 21, 22 and 23 are determined by means of the sensors 14, 15, 16 and 17, respectively.

The sensors 13, 14, 15, 16 and 17 are each connected to a bus system 24. The bus system 24 is connected to a control unit 25. The control unit 25 receives the measured signals from the sensors 13, 14, 15, 16 and 17 by way of the bus system 24. On the basis of these measured signals, the control unit 25 determines a correcting variable for adjusting the slabstock process. For example, there is used as the correcting variable the weight of the cover 9 and/or the speed of the transport belt 1 and/or the amount of reactive chemical system supplied per unit time via the mixing head 3 and/or the chemical composition of the system.

In order to carry out the adjustment, the difference between the actual heights and the desired heights is evaluated. The correcting variable is then determined according to the difference between the desired heights and the actual heights. This can also be effected, for example, by plotting a compensating curve on the basis of the actual heights 18, 20, 21, 22 and 23 determined by measurement. This may be a regression line or a polynomial, for example a spline polynomial or wavelets.

The different gradients of the curves can further be used to determine the correcting variable. This difference in the gradient represents a measure of the deviation of the actual heights from the desired heights.

Alternatively or in addition it is possible, for example, to compare the integrals of the actual curve and the integral of the desired curve. The difference in the two integrals in turn constitutes a measure of the deviation of the actual profile from the desired profile.

Alternatively or in addition it is also possible to use characteristic points or points of inflection of the actual and desired curves to determine a correcting variable.

FIG. 3 shows a correctly adjusted foam cross-sectional profile, in which the height profile 26 (foam ear) between the cover weight 9 and the side wall 7, or the side paper 8, projects slightly beyond the rectangular contour 27. With this form it is ensured on the one hand that the waste due to cutting is low. On the other hand, the region immediately adjacent to the wall of the tool is also sufficiently filled with foam and the foam structure has a uniform structure over the entire cross-section.

If, however, a cross-sectional height profile 28 or 29 according to FIG. 4 or FIG. 5 which differs from the ideal case were to be obtained, it would be necessary in each case to adapt the weight of the cover 9 and/or the speed of the transport belt 1 and/or the amount of reactive chemical system supplied per unit time via the mixing head 3 and/or the chemical composition of the system and/or the movement pattern of the foaming head and/or the gap between the cover paper and the side paper in accordance with the measured values of the height measurement, until the cross-sectional height profile according to FIG. 3 is achieved again.

Plants of the Draka-Petzetakis type operate without cover weights. The side films are guided in the foaming direction synchronously with the foaming process, in order thus to prevent dome formation. FIG. 6 shows a foam profile in which the side film 8 between the foam tunnel wall 7 and the foam 4 is moved too rapidly in the foaming direction. A foam profile 30 that is curved upwards is obtained. FIG. 7 shows a foam profile in which the side film 8 between the foam tunnel wall 7 and the foam 4 is moved too slowly in the foaming direction. A foam profile 31 that is curved downwards is obtained. The situations shown in FIGS. 6 and 7 also apply in respect of the Maxfoam process. In the Maxfoam process, dome formation is suppressed primarily by a foaming trough and the run-off slope, onto which the already reacting foam is applied. At the same time, analogously to the Draka-Petzetakis process, the side films can be moved along in the foaming direction. In this process too, the speed at which the film is moved is to be adjusted to the parameters of the process and the recipe.

LIST OF REFERENCE NUMERALS

Transport belt 1
Feed direction 2
Mixing head 3
Expanding foam 4
Cover paper 5
Rollers 6
Foam tunnel wall 7
Side paper 8
Cover weight 9
Counterweight 10
Guide system 11
Cable 12
Sensor 13
Sensor 14
Sensor 15
Sensor 16
Sensor 17
Foam height 18
Distance 19
Foam height 20
Foam height 21
Foam height 22
Foam height 23
Bus system 24
Control unit 25
Desired foam cross-sectional profile 26
Rectangular foam profile 27
Cross-sectional profile 28
Cross-sectional profile 29
Cross-sectional profile 30
Cross-sectional profile 31

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of foam in a continuous slabstock process, comprising:
    a) detecting the foam's actual height profile at a plurality of points aligned transverse to the feed direction of foam-forming mixture,
    b) determining a correcting variable for the slabstock process based on deviation of actual foam height profile from a desired foam height profile, and
    c) adjusting at least one processing parameter if the foam's actual height profile differs from the desired foam height profile.

2. The process of claim 1 in which the foam is polyurethane foam.

3. The process of claim 1 in which the continuous slabstock process is a Hennecke-Planibloc process, a Draka-Petzetakis process, a Maxfoam process, a process conducted with a UBT apparatus or a process conducted with a QFM apparatus.

4. The process of claim 1 in which a conveyor device having a conveyor belt driven in the feed direction is employed.

5. The process of claim 4 in which the conveyor device has a fall plate.

6. The process of claim 1 in which the actual foam height profile is detected by means of height sensors arranged transversely to the feed direction.

7. The process of claim 1 in which weight of a cover lying on the slabstock foam is the correcting variable.

8. The process of claim 1 in which speed and angle of side papers or side films relative to the foaming process and/or the side paper or film tension is the correcting variable.

9. The process of claim 1 in which conveying speed of the foam is the correcting variable.

10. The process of claim 1 in which amount of material supplied to the slabstock process per unit time is the correcting variable.

11. The process of claim 1 in which application method and/or movement of the mixing head is the correcting variable.

12. The process of claim 1 in which a gap between the cover paper and a side paper is used as the correcting variable.

13. Plant for the production of foam in a continuous slabstock process comprising:
    a) a foam height detector for detecting actual foam heights of the foam at a plurality of points aligned transversely to foam-forming mixture feed direction, and
    b) means for determining a correcting variable for the slabstock process based on deviation of actual foam heights from given desired foam heights.

14. The plant of claim 13 further comprising a UBT or QFM apparatus.

15. The plant claim 13 further comprising a conveyor device which has a conveyor belt that can be driven in a feed direction.

16. The plant of claim 13 further comprising a fall plate.

17. The plant of claim 13 in which the foam height detector comprises height sensors arranged transversely to the feed direction.

* * * * *